United States Patent
Wu et al.

(10) Patent No.: US 12,164,139 B2
(45) Date of Patent: Dec. 10, 2024

(54) BACKLIGHT MODULE, DISPLAY SCREEN, REARVIEW MIRROR, AND VEHICLE

(71) Applicants: Hefei Xinsheng Optoelectronics Technology Co., Ltd., Anhui (CN); BOE Technology Group Co., Ltd., Beijing (CN)

(72) Inventors: Xiaojun Wu, Beijing (CN); Haifeng Xu, Beijing (CN); Hui Dong, Beijing (CN); Tao Liu, Beijing (CN); Yu Song, Beijing (CN); Jinfeng Zhang, Beijing (CN); Qiang Zhang, Beijing (CN); Wenda Yang, Beijing (CN)

(73) Assignees: HEFEI XINSHENG OPTOELECTRONICS TECHNOLOGY CO., LTD., Anhui (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 18/020,463

(22) PCT Filed: Mar. 22, 2022

(86) PCT No.: PCT/CN2022/082268
§ 371 (c)(1),
(2) Date: Feb. 9, 2023

(87) PCT Pub. No.: WO2023/178514
PCT Pub. Date: Sep. 28, 2023

(65) Prior Publication Data
US 2024/0264359 A1     Aug. 8, 2024

(51) Int. Cl.
*F21V 8/00* (2006.01)
*B60R 1/12* (2006.01)
*G02F 1/13357* (2006.01)

(52) U.S. Cl.
CPC ..... *G02B 6/0055* (2013.01); *G02F 1/133615* (2013.01); *B60R 1/12* (2013.01); *B60R 2001/1215* (2013.01)

(58) Field of Classification Search
CPC ............ G02B 6/0055; G02F 1/133615; B60R 2001/1215; B60R 1/12
See application file for complete search history.

(56) References Cited

U.S. PATENT DOCUMENTS

| | | |
|---|---|---|
| 2007/0146612 A1 | 6/2007 | Fujishima |
| 2008/0117577 A1 | 5/2008 | Kang et al. |

(Continued)

FOREIGN PATENT DOCUMENTS

| | | | | |
|---|---|---|---|---|
| CN | 104344286 A | * | 2/2015 | ........... G02B 6/0025 |
| CN | 106133561 A | | 11/2016 | |

(Continued)

*Primary Examiner* — Mariceli Santiago
(74) *Attorney, Agent, or Firm* — WHDA, LLP

(57) ABSTRACT

The application provides a backlight module, a display screen, a rearview mirror and a vehicle, and relates to the field of display technology, and the backlight module may greatly reduce a risk of separation between a reflection unit and a light-guide plate. The backlight module includes: a light-guide plate, including: a light-outlet surface and a backlight surface set opposite to each other, and a side surface, wherein the side includes a first sub-side surface and a second sub-side surface connected to each other: a light-emitting unit, arranged at the first sub-side surface of the light-guide plate; and a reflection unit, including: a main reflection unit and a side-reflection unit, wherein the side-reflection unit is arranged at the second sub-side surface of the light-guide plate, the side-reflection unit includes at least a first side-reflection subunit and a plurality of connecting parts, the first side-reflection subunit includes at least a plurality of first reflection parts, each of the first reflection parts is connected with at least one of the connecting parts, (Continued)

a first gap presents between the main reflection unit and a part of the first reflection part where the first reflection part is not connected with the connecting part, and a second gap presents between two adjacent first reflection parts.

20 Claims, 13 Drawing Sheets

(56) References Cited

U.S. PATENT DOCUMENTS

| | | | |
|---|---|---|---|
| 2013/0021819 A1 | 1/2013 | Wang et al. | |
| 2017/0276861 A1* | 9/2017 | Watanabe | G02B 6/0033 |
| 2019/0243053 A1 | 8/2019 | Ono et al. | |

FOREIGN PATENT DOCUMENTS

| | | |
|---|---|---|
| CN | 207037283 U | 2/2018 |
| CN | 108873483 A | 11/2018 |
| CN | 109863370 A | 6/2019 |
| CN | 213634059 U | 7/2021 |
| IN | 208834051 U | 5/2019 |
| JP | 2007-171877 A | 7/2007 |
| KR | 20080045380 A | 5/2008 |
| TW | 201305675 A | 2/2013 |

* cited by examiner

BACKLIGHT MODULE, DISPLAY SCREEN, REARVIEW MIRROR, AND VEHICLE

CROSS-REFERENCE TO RELATED APPLICATION

The present disclosure is a National Stage of International Application No. PCT/CN2022/082268, filed on Mar. 22, 2022, with the title of "BACKLIGHT MODULE, DISPLAY SCREEN, REARVIEW MIRROR, AND VEHICLE", which is incorporated herein in its entirety by reference.

FIELD

The application relates to the field of display technology, in particular to a backlight module, a display screen, a rearview mirror and a vehicle.

BACKGROUND

With increasing requirements for brightness of display modules of vehicle-mounted products, high temperature ranges to be borne by side-entry backlights are becoming more and more severe, which puts forward higher requirements for structures of backlight modules.

SUMMARY

Embodiments of the application adopts the following technical solutions:

In an aspect of the disclosure, a backlight module is provided, including:
- a light-guide plate, including: a light-outlet surface and a backlight surface set opposite to each other, and a side surface, wherein the side surface is respectively connected with the light-outlet surface and the backlight surface, and the side includes a first sub-side surface and a second sub-side surface connected to each other;
- a light-emitting unit, arranged at the first sub-side surface of the light-guide plate; and
- a reflection unit, including: a main reflection unit and a side-reflection unit, wherein the main reflection unit is arranged at the backlight surface of the light-guide plate, the side-reflection unit is arranged at the second sub-side surface of the light-guide plate, the side-reflection unit includes at least a first side-reflection subunit and a plurality of connecting parts, the plurality of connecting parts are connected with the main reflection unit, the first side-reflection subunit includes at least a plurality of first reflection parts, each of the first reflection parts is connected with at least one of the connecting parts, a first gap presents between the main reflection unit and a part of the first reflection part where the first reflection part is not connected with the connecting part, and a second gap presents between two adjacent first reflection parts.

In an embodiment of the disclosure, the first reflection part is connected with the main reflection unit through three connecting parts.

In an embodiment of the disclosure, two ends and a middle position of the first reflection part are respectively connected with the connecting parts.

In an embodiment of the disclosure, the two ends of the first reflection part are respectively a first end and a second end, and
in two adjacent first reflection parts, a third gap is provided, between the connecting part connected with the second end of one of the two first reflection parts and the connecting part connected with the first end of another one of the two first reflection parts, and a position of the third gap corresponds to a position of the second gap.

In an embodiment of the disclosure, the first reflection part includes a first reflection layer and a first adhesive layer, the first reflection layer is connected with at least one connecting part and is fixed with the second sub-side surface through the first adhesive layer, and the first reflection layer and the connecting part are an integral structure.

In an embodiment of the disclosure, sizes of the plurality of connecting parts are the same.

In an embodiment of the disclosure, a width of the connecting part along a first preset direction ranges from 0.5 mm to 3 mm.

In an embodiment of the disclosure, a distance between two adjacent first reflection parts along a first preset direction ranges from 0.1 mm to 0.3 mm.

In an embodiment of the disclosure, the second sub-side surface includes a first part and a second part set opposite to each other, and a third part, the third part is respectively connected with the first part and the second part, and the first sub-side surface is respectively connected with the first part and the second part and is set opposite to the third part; and
the side-reflection unit includes the first side-reflection subunit and the plurality of connecting parts, and the first part, the second part and the third part are respectively provided with the first side-reflection subunit.

In an embodiment of the disclosure, a ratio of a length of the first part along a first direction to a length of the third part along the second direction is L, $0.8 \leq L \leq 1$, and the first direction intersects the second direction.

In an embodiment of the disclosure, the second sub-side surface includes a first part and a second part set opposite to each other, and a third part, the third part is respectively connected with the first part and the second part, and the first sub-side surface is respectively connected with the first part and the second part and is set opposite to the third part; and
the side-reflection unit further includes second side-reflection subunits, the second side-reflection subunits are not connected with the main reflection unit, the first part and the second part are respectively provided with the second side-reflection subunits, and the third part is provided with the first side-reflection subunit.

In an embodiment of the disclosure, the second side-reflection subunit includes a reflection film and an adhesive film, and the reflection film is fixed with the second sub-side surface through the adhesive film.

In an embodiment of the disclosure, a ratio of a length of the first part along a first direction to a length of the third part along a second direction is L, $\frac{1}{5} \leq L \leq \frac{1}{2}$, and the first direction intersects the second direction.

In an embodiment of the disclosure, the second sub-side surface includes a first part and a second part set opposite to each other, and a third part, the third part is respectively connected with the first part and the second part, and the first sub-side surface is respectively connected with the first part and the second part and is set opposite to the third part;
the third part is provided with the first side-reflection subunit, the first part and the second part are provided with either of the first side-reflection subunit and the second side-reflection subunit, and the first side-reflection subunit set on the third part is a fixed side-reflection subunit;
the fixed side-reflection subunit further includes second reflection parts, a whole formed by the plurality of first reflection parts in the fixed side-reflection subunit is a fixed side-reflection part, two ends of the fixed side-reflection part are respectively provided with the second reflection parts, the fixed side-reflection part is not connected with the second reflection parts, and the second reflection parts are connected with the main reflection unit; and the backlight module further includes a fixing unit, the fixing unit is arranged at a side of the second reflection part away from the third par, and an orthographic projection of the fixing unit on the third part is within an orthographic projection of the second reflection part on the third part.

In an embodiment of the disclosure, in the fixed side-reflection subunit, two ends and a middle position of the first reflection part are respectively connected with connecting parts; and a groove is arranged between the fixed side-reflection subunit and the second reflection part.

In an embodiment of the disclosure, a width of the second reflection part along a direction perpendicular to a second preset direction is the same as a width of a whole formed by the first reflection part and the connecting parts along the direction perpendicular to the second preset direction.

In an embodiment of the disclosure, the second reflection part includes a second reflection layer and a second adhesive layer, and the second reflection layer is fixed with the third part through the second adhesive layer, the main reflection unit includes a main reflection layer, and the second reflection layer is connected with the main reflection layer; and the main reflection layer, the respective second reflection layers, the respective first reflection layers and the respective connecting parts are an integral structure.

In another aspect of the disclosure, a display screen is provided, including a display panel and the above backlight module, wherein the backlight module is arranged at a backlight side of the display panel.

In further another aspect of the disclosure, a rearview mirror is provided, including the above display screen.

In still further another aspect of the disclosure, a vehicle is provided, including the above rearview mirror, wherein the rearview mirror is set in an internal space of the vehicle.

The above description is only an overview of the technical solutions of the application. In order to better understand the technical means of the application, so as to be implemented according to the contents of the specification, and in order to make the above and other purposes, features and advantages of the application more distinct and understandable, specific implementations of the application are listed below.

BRIEF DESCRIPTION OF THE DRAWINGS

In order to more clearly illustrate technical solutions in embodiments of the disclosure or in prior art, the followings will briefly introduce drawings needed to be used in illustrating the embodiments or the prior art. Apparently, the drawings in the following description are only some embodiments of the disclosure. For those ordinary skilled in the field, they may further obtain other drawings according to the provided drawings without paying creative labor.

DETAILED DESCRIPTION OF THE EMBODIMENTS

In order to make purposes, technical solutions and advantages of the embodiments of the application clearer, the followings will describe the technical solutions in the embodiments of the application clearly and completely in combination with the drawings in the embodiments of the application. Apparently, the described embodiments are a part of the embodiments of the application, not all of the embodiments of the application. Based on the embodiments in the application, all other embodiments obtained by the ordinary skilled in the art without doing creative work belong to the scope of protection in the application.

In the embodiments of the application, words such as "first", "second" and "third" are used to distinguish the same or similar items with basically the same function and action, which is only for the sake of clearly describing the technical solutions of the embodiments of the application, and shall not be understood as indicating or implying a relative importance or implicitly indicating a quantity of the indicated technical features. In addition, "a plurality of" means two or more, and "at least one" means one or more, unless otherwise specified.

A vehicle-mounted streaming-media rearview mirror takes images of the rear of a vehicle in real time via a camera located at the rear of the vehicle, and presents the images via a display screen of the rearview mirror. That is, a real situation behind the vehicle may be observed from a perspective of the camera, which may greatly reduce a blind area of vision and enhance a night vision ability. The vehicle-mounted streaming-media rearview mirror is equipped with an electrochromic (EC) mirror, a light transmittance range of which is about 30%-40%. In order to ensure an imaging effect of the rearview mirror, a brightness of the rearview mirror should reach more than 1000 nits. If the display screen of the rearview mirror is formed by a liquid crystal display (LCD) screen, the brightness of a backlight module of the LCD screen needs to reach more than 3000 nits to meet imaging requirements. The brightness of conventional vehicle-mounted instruments or central control modules is 800-1200 nits. Compared with the requirements of the conventional vehicle-mounted instruments, the higher the brightness of the backlight module of the rear-view mirror, the higher a temperature range that the backlight module needs to bear. In order to reduce volume and facilitate realization of thinness, the backlight module may adopt a structure of a side-entry backlight.

Figure 1:
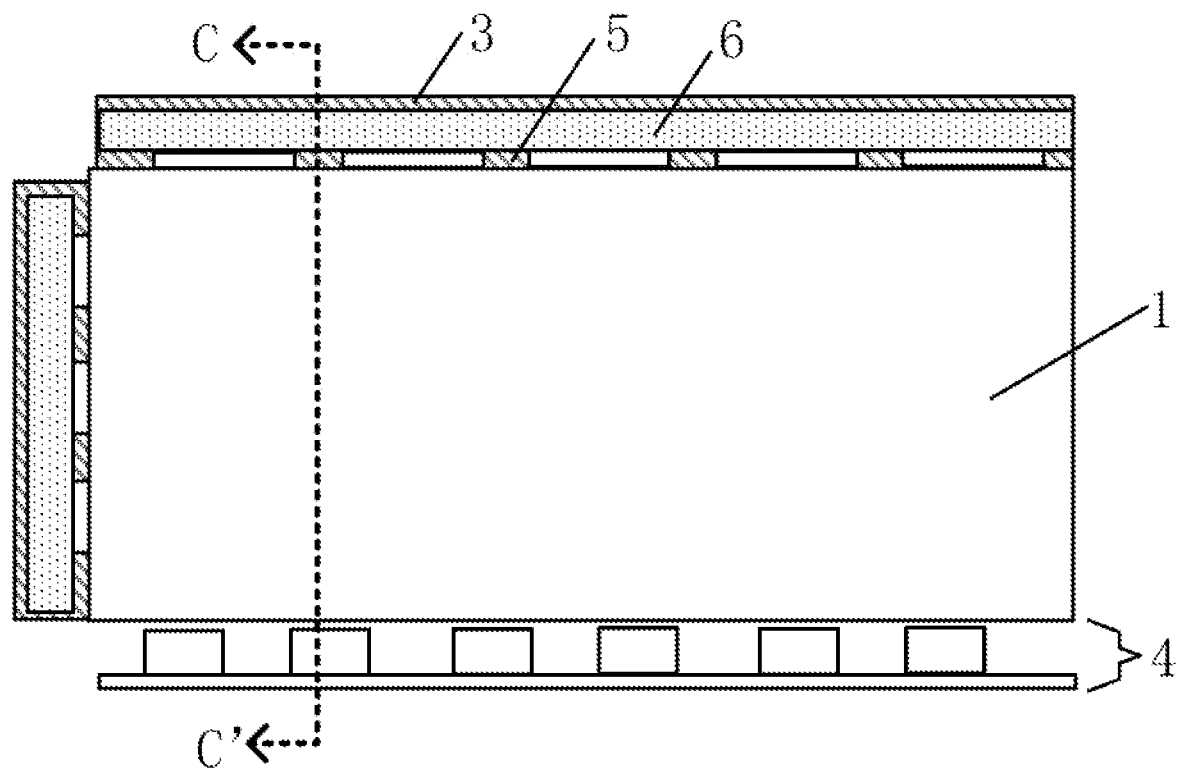
FIG. 1 is a schematic view illustratively showing a structure of a backlight module.
Figure 2:
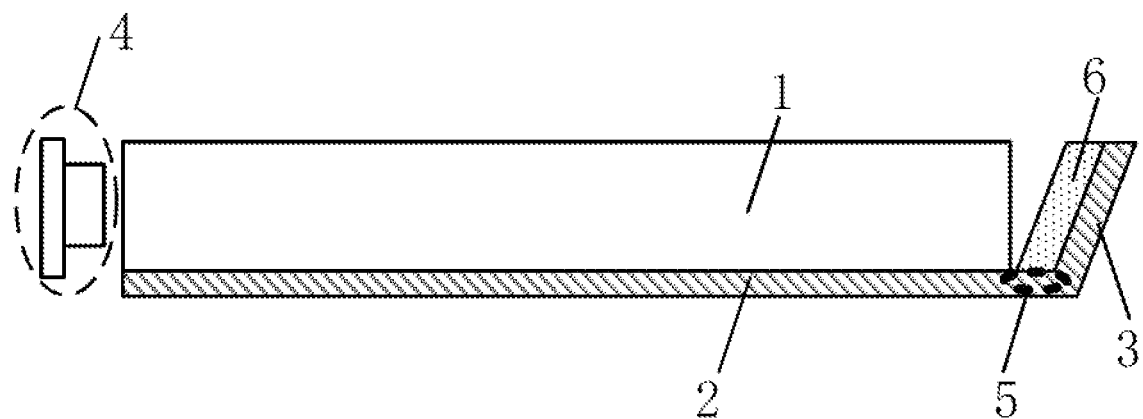
FIG. 2 is a sectional view along a direction of CC' in FIG. 1.

As shown in a combination of FIG. 1 and FIG. 2, the backlight module may include a light-guide plate 1, a reflect sheet and a light-emitting diode (LED) light strip 4. The reflect sheet includes a bottom reflect sheet 2 and a side reflect sheet 3. The bottom reflect sheet 2 and the side reflect sheet 3 are connected through a connection point 5. The bottom reflect sheet 2 is arranged at a light-inlet side of the light-guide plate 1. The side reflect sheet 3 and a side edge of the light-guide plate 1 are bonded by double-sided adhesive 6. The LED light strip 4 is arranged at a side of the light-guide plate 1, at which no side reflect sheet 3 is bonded. FIG. 1 is a schematic view showing an assembly in which a side of the light-guide plate is not bonded with the side reflect sheet. FIG. 2 is a sectional view along a direction of CC' in FIG. 1.

Figure 3:
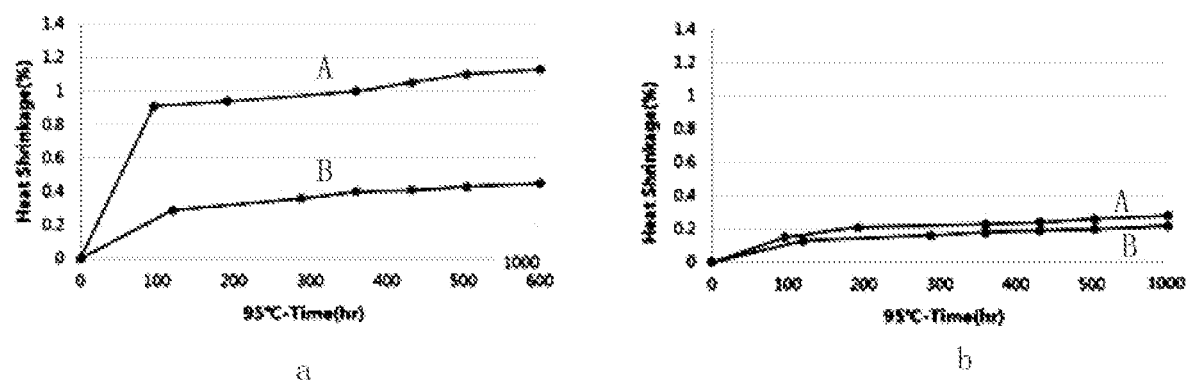
FIG. 3 are curve charts, wherein chart a is the curve chart showing a thermal shrinkage rate in a direction of MD (machine direction, or rolled material direction) changing with time at a high temperature of 95° C. for material A and material B, and chart b is the curve chart showing a thermal shrinkage rate in a direction of TD (transverse direction, or non-rolled material direction) changing with time at the high temperature of 95° C. for the material A and the material B.
Figure 4:
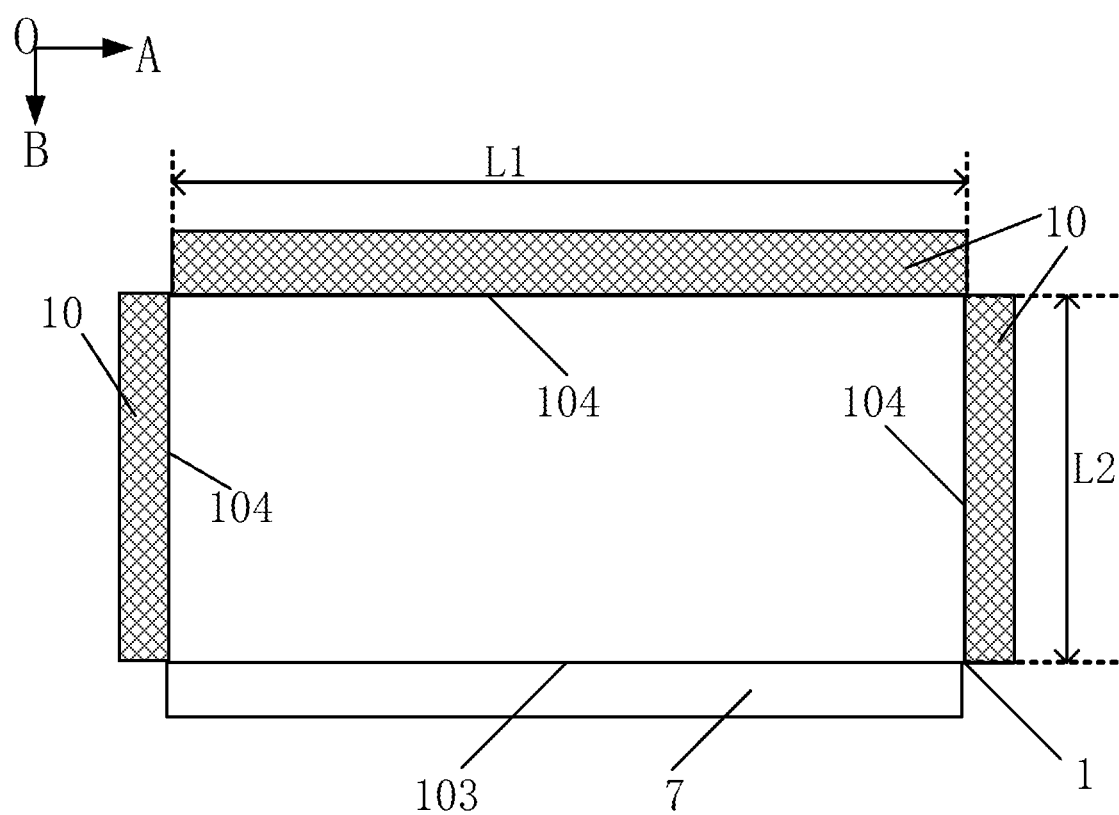
FIG. 4 and FIG. 5 are schematic views illustratively showing structures of another two backlight modules of the embodiments of the disclosure.

Due to thermal shrinkage characteristics of materials of vehicle-mounted reflect sheets, sizes of the reflect sheets are greatly reduced at high temperature. By performing high temperature shrinkage tests on two commonly used materials of the reflect sheet, curve charts as shown in FIG. 3 may be obtained. In FIG. 3, chart a is the curve chart showing a thermal shrinkage rate in a direction of MD (machine direction, or rolled material direction) changing with time at a high temperature of 95° C. for material A and material B, and chart b is the curve chart showing a thermal shrinkage rate in a direction of TD (transverse direction, or non-rolled material direction) changing with time at the high temperature of 95° C. for the material A and the material B. From the chart a and the chart b, it may be seen that a maximum of the shrinkage rate along the direction of TD is 0.28% after the high temperature, while the shrinkage rate along the direction of MD is up to 1.1% after the high temperature. In backlight modules with large ratios of length to width, the reflect sheets are mostly cut in the TD direction to reduce shrinkage of the reflect sheets in a long-side direction.

However, sizes of the light-guide plates decrease slightly after high temperature, about 0.06%. That is, the shrinkage rates of the reflect sheet and the light-guide plate after high temperature is inconsistent, which will lead to a dislocation for shrinkage sizes, at bonding positions of double-sided adhesive, between the side reflect sheet and the light-guide plate, thus causing the side reflect sheet and the light-guide plate to degum and separate, which increases light loss for internal reflection of the light-guide plate, eventually causes a change of backlight brightness, and reduces display quality.

Based on the above, the embodiments of the application provide a backlight module, as shown in a combination of FIG. 4-FIG. 8, the backlight module includes a light-guide plate 1, a light-emitting unit 7 and a reflection unit 8.

The light-guide plate 1 includes a light-outlet surface 101 and a backlight surface 102 set opposite to each other, and a side surface 100, and the side surface 100 is respectively connected with the light-outlet surface 101 and the backlight surface 102; and the side 100 includes a first sub-side surface 103 and a second sub-side surface 104 connected to each other.

The light-emitting unit 7 is arranged at the first sub-side surface 103 of the light-guide plate 1.

The reflection unit 8 includes a main reflection unit 9 and a side-reflection unit 10, the main reflection unit 9 is arranged at the backlight surface 102 of the light-guide plate 1, and the side-reflection unit 10 is arranged at the second sub-side surface 104 of the light-guide plate 1; wherein the side-reflection unit 10 includes at least a first side-reflection subunit 11 and a plurality of connecting parts 12, the plurality of connecting parts 12 are connected with the main reflection unit 9, the first side-reflection subunit 11 includes at least a plurality of first reflection parts 13, each of the first reflection parts 13 is connected with at least one of the connecting parts 12, a first gap 14 presents between the main reflection unit and a part of the first reflection part 13, where the first reflection part 13 is not connected with the connecting part, and a second gap 15 presents between two adjacent first reflection parts 13.

A shape of the light-outlet surface of the light-guide plate is not limited. For example, the shape of the light-outlet surface of the light-guide plate may be a quadrilateral, such as a rectangular or a square: alternatively, it may be a regular shape such as a triangle or a circle as well; it may be other irregular shapes as well. A specific shape of the light-guide plate may be determined according to a shape of a display panel.

A specific structure of the above light-emitting unit is not limited. For example, the light-emitting unit may include a plurality of light-emitting diodes arranged in an array.

The above side-reflection unit includes at least the first side-reflection subunit and the plurality of connecting parts, which means that the side-reflection unit only includes the first side-reflection subunit and the plurality of connecting parts, and at this time, the side-reflection unit is connected with the main reflection unit. Alternatively, the side-reflection unit includes the first side-reflection subunit and the plurality of connecting parts, and may further include other structures, such as a second side-reflection subunit 17 shown in FIG. 9, where the second side-reflection subunit is not connected with the main reflection unit, and at this time, a part of the side-reflection unit is connected with the main reflection unit, and the rest part of the side-reflection unit is not connected with the main reflection unit.

A specific number of the first reflection part included in the above side-reflection unit may be determined according to a size of the light-guide plate, which is not limited here.

In this application, the side-reflection unit includes at least the first side-reflection subunit and the plurality of connecting parts, the first side-reflection subunit includes at least the plurality of first reflection parts, and the second gap is arranged between two adjacent first reflection parts. Compared with the side reflect sheet set continuously in a whole section, the first side-reflection subunit of the application is set with the plurality of discontinuous first reflection parts, which may reduce stresses generated by shrinkage under high temperature, and at the same time reduce a difference of shrinkage amount of size between the whole first side-reflection subunit and the light-guide plate, thus greatly reducing a risk of separation between the first side-reflection subunit and the light-guide plate, and thus ensuring amount of reflected light in the light-guide plate: such that when the light-guide plate is applied to a display device, it may greatly improve display quality.

In actual production, a reflect sheet including a pattern of the main reflection unit and a pattern of the side-reflection unit may be formed first, and then the reflect sheet may be bent, to make the first side-reflection subunit in the side-reflection unit be fixed to the second sub-side surface of the light-guide plate. If a number of connecting parts is too small, it is easy to break during a bending process, which affects fitting between the first side-reflection subunit and the second sub-side surface of the light-guide plate. If the number of connecting parts is too large, it is not conducive to bending. In order to balance the above two circumstance, in an embodiment of the disclosure, referring to that shown in FIG. 5, the first reflection part 13 is connected with the main reflection unit (not shown in FIG. 5) through three connecting parts 12. Here, a position distribution and a size of the three connecting parts are not limited.

Figure 5:
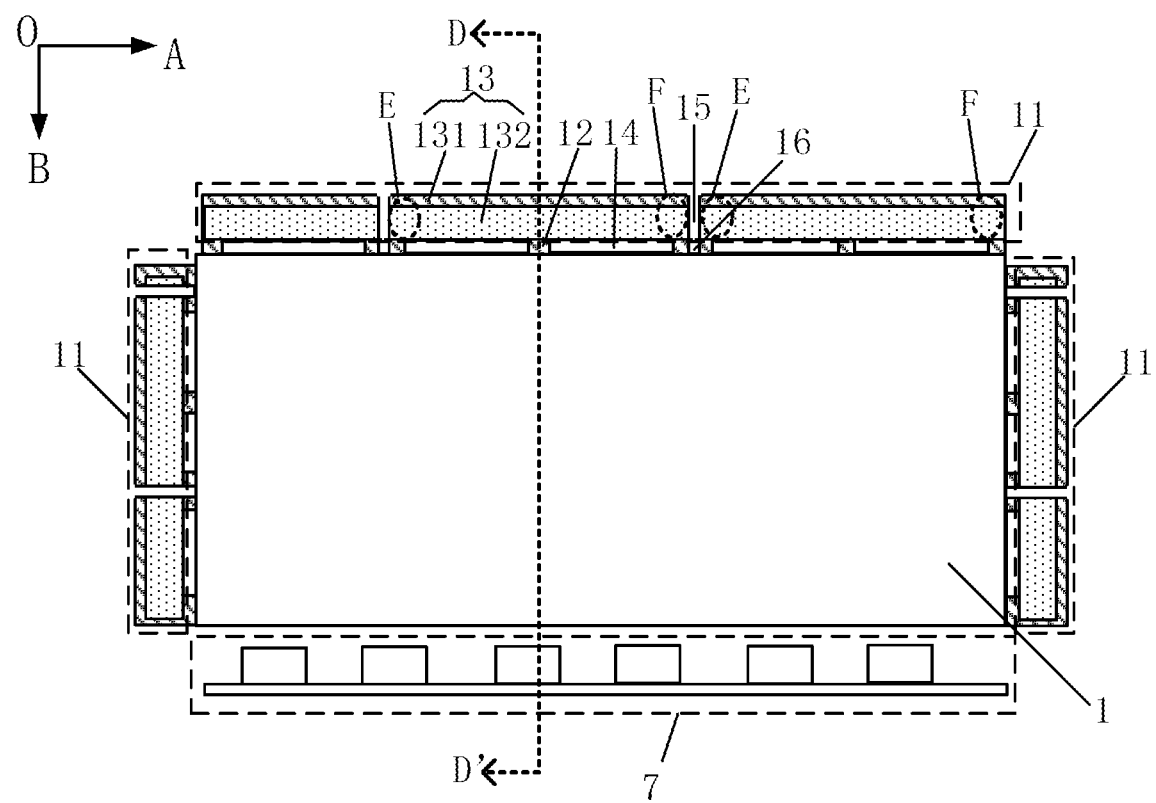

Further in an embodiment of the disclosure, in order to further improve connection stability between the first reflection part and the main reflection unit, and further facilitate the bending, referring to that shown in FIG. 5, two ends and a middle position of the first reflection part 13 are respectively connected with the connecting parts 12. Referring to that shown in FIG. 7, in the first reflection part, the distance between the connecting part at the middle position and the connecting parts at the two ends along an OA direction is w1, w1 may be 16 mm, it may be other values as well, which may be determined according to an actual size of the light-guide plate.

Figure 7:
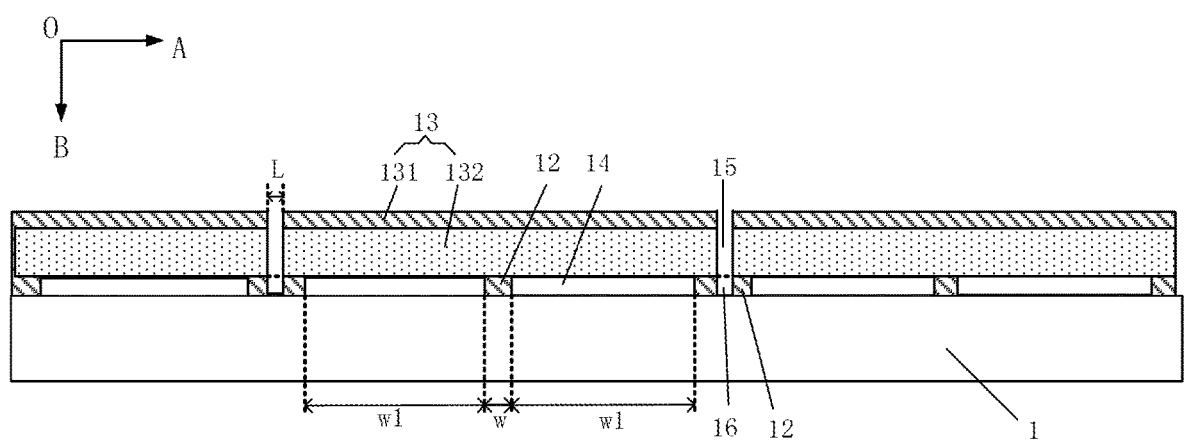
FIG. 7 is a schematic view enlarging a first side-reflection subunit arranged at an upper side of a light-guide plate in FIG. 5.
Figure 8:
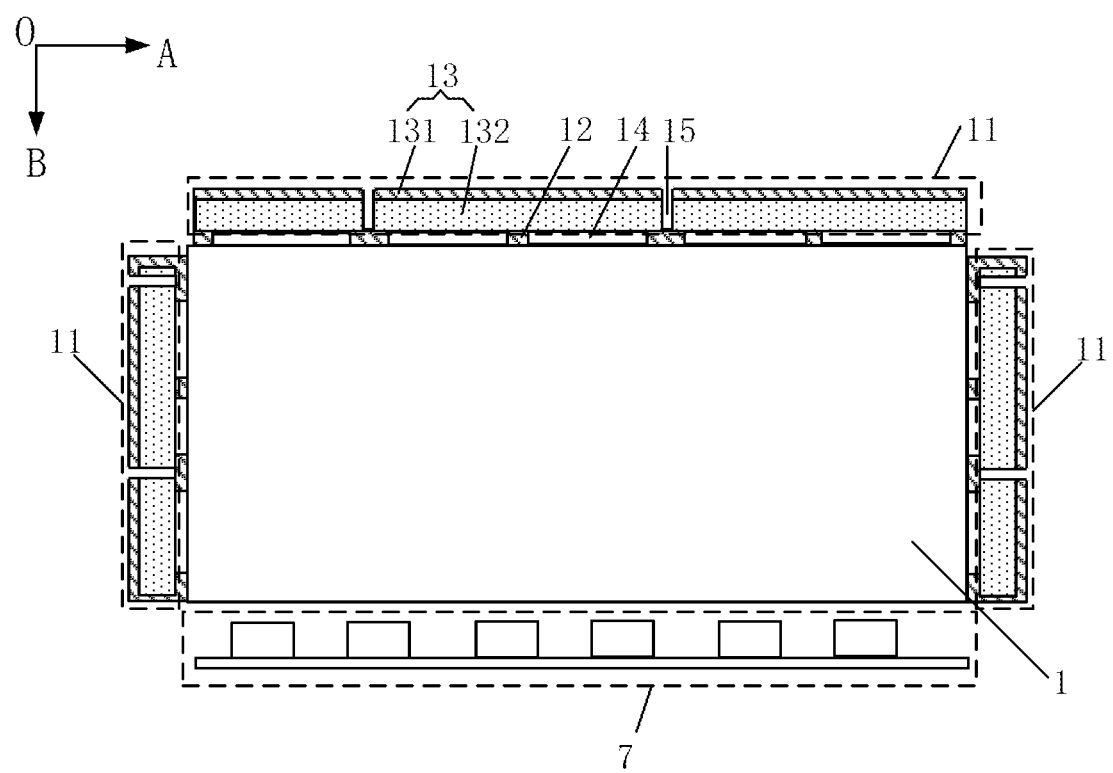
FIG. 8-FIG. 10 are schematic views illustratively showing structures of another three backlight modules.

Further in an embodiment of the disclosure, the two ends of the first reflection part are respectively a first end (E end shown in FIG. 5) and a second end (F end shown in FIG. 5). As shown in FIG. 5 and FIG. 7, in two adjacent first reflection parts, a third gap 16 is provided, between the connecting part connected with the second end of one of the two first reflection parts (the F end shown in FIG. 5) and the connecting part connected with the first end of the other first reflection part (the E end shown in FIG. 5). A position of the third gap corresponds to a position of the second gap.

The above second gap and third gap are interconnected, so that more space may be left to reduce the stresses generated by shrinkage of the first reflection part under high temperature, and at the same time to avoid mutual influence of adjacent first reflection parts. Referring to that shown in FIG. 8, in two adjacent first reflection parts 13, the connecting part connected with the second end of one of the two first reflection parts and the connecting part connected with the first end of the other first reflection part, may be connected, that is, there is no gap between them, which may improve the connection stability of the first reflection part and the main reflection unit.

Figure 6:
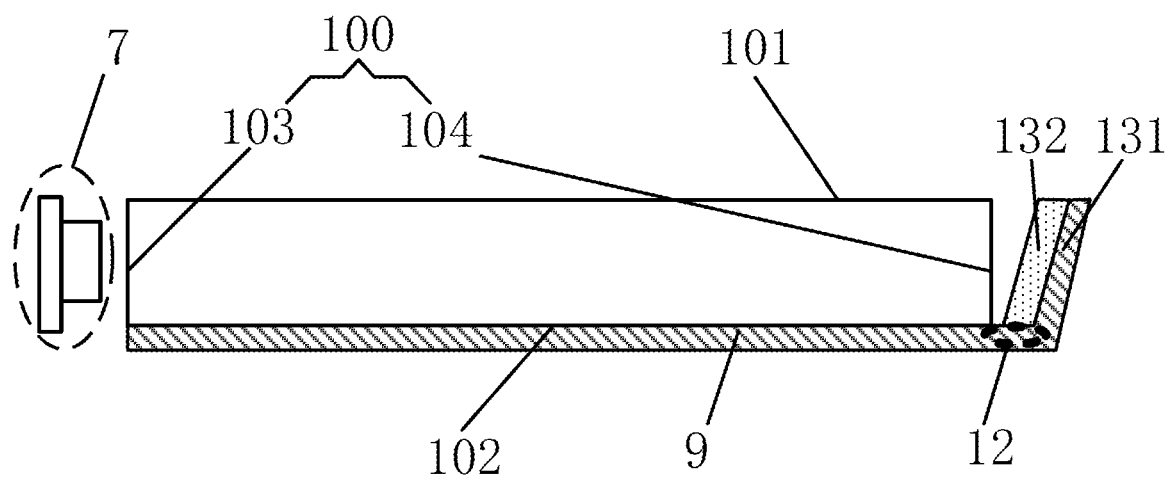
FIG. 6 is a sectional view along a direction of DD' in FIG. 5.

In one or more embodiments, in order to simplify structure and reduce manufacturing difficulty, as shown in a combination of FIG. 5 and FIG. 6, the first reflection part 13 includes a first reflection layer 131 and a first adhesive layer 132. The first reflection layer 131 is connected with at least one connecting part 12, and is fixed with the second sub-side surface 104 through the first adhesive layer 132. The first reflection layer and the connecting part are an integral structure. In this way, they may be formed by the same process. At this time, material of the first reflection layer and material of the connecting part are the same.

In one or more embodiments, in order to ensure consistency of connection between the respective first reflection parts and the main reflection unit, that is, to reduce difference of connection between the respective first reflection parts and the main reflection unit, sizes of the plurality of connecting parts are the same.

In an embodiment of the disclosure, as shown in FIG. 7, a width w of the connecting part 12 along a first preset direction (the OA direction shown in FIG. 7) ranges from 0.5 mm to 3 mm. For example, the width of the connecting part 12 along the first preset direction may be 0.5 mm, 1.0 mm, 2.0 mm, or 3 mm, etc. Here, the first preset direction refers to an arrangement direction of the first reflection parts connected with the connecting parts. As shown in FIG. 5, the arrangement direction of the first reflection parts set on a long-side of the light-guide plate is the OA direction. At this time, the width of the connecting part set on the long-side along the first preset direction is the width of the connecting part set on the long-side along the OA direction. The arrangement direction of the first reflection parts set on a short-side of the light-guide plate is an OB direction. At this time, the width of the connecting part set on the short-side along the first preset direction is the width of the connecting part set on the short-side along the OB direction.

The above connecting parts may be formed by a cutting die process. It may be formed by other processes, such as a laser cutting process, as well. At this time, the width of the connecting part along the first preset direction may be less than 0.5 mm, such as 0.2 mm or 0.3 mm.

In one or more embodiments, referring to that shown in FIG. 7, a distance L between two adjacent first reflection parts 13 along the first preset direction (the OA direction shown in FIG. 7) ranges from 0.1 mm to 0.3 mm. For example, the distance between two adjacent first reflection parts 13 along the first preset direction may be 0.1 mm. 0.2 mm, 0.3 mm, etc. In addition, a length of the first reflection part along the first preset direction is not limited, which needs to be determined according to the size of the light-guide plate. For example, the length of the first reflection part along the first preset direction may be 32 mm.

The followings provide a specific structure of the light-guide plate and the reflection unit. In one or more embodiments, the second sub-side surface includes a first part (a left side surface shown in FIG. 4) and a second part (a right side surface shown in FIG. 4) set opposite to each other, and a third part (an upper side surface shown in FIG. 4). The third part is respectively connected with the first part and the second part, and the first sub-side surface is respectively connected with the first part and the second part, and is set opposite to the third part.

The side-reflection unit includes the first side-reflection subunit 11 and the plurality of connecting parts 12. The first part, the second part and the third part are respectively provided with the first side-reflection subunit 11.

This structure is mainly used in small rectangular display screens, which is less than 8 inches, with a ratio of length to width close to 1. The three sides of the light-guide plate are respectively provided with the first side-reflection subunit, and the rest side is provided with the light-emitting unit, which may effectively solve a problem of degumming and separation between the first side-reflection subunit and the light-guide plate.

Optionally, the ratio of the length L2 of the first part (the left side surface shown in FIG. 5) along the first direction (the OB direction shown in FIG. 5) to the length L1 of the third part (the upper side surface shown in FIG. 5) along the second direction (the OA direction shown in FIG. 5) is L, $0.8 \leq L \leq 1$, and the first direction intersects the second direction. Here, the first direction may be a direction of the short-side of the light-guide plate, and the second direction may be a direction of the long-side of the light-guide plate.

The followings provide another specific structure of the light-guide plate and the reflection unit. In one or more embodiments, the second sub-side surface includes the first part (the left side surface shown in FIG. 9) and the second part (the right side surface shown in FIG. 9) set opposite to each other, and the third part (the upper side surface shown in FIG. 9). The third part is respectively connected with the first part and the second part, and the first sub-side surface is respectively connected with the first part and the second part, and is set opposite to the third part.

Figure 9:
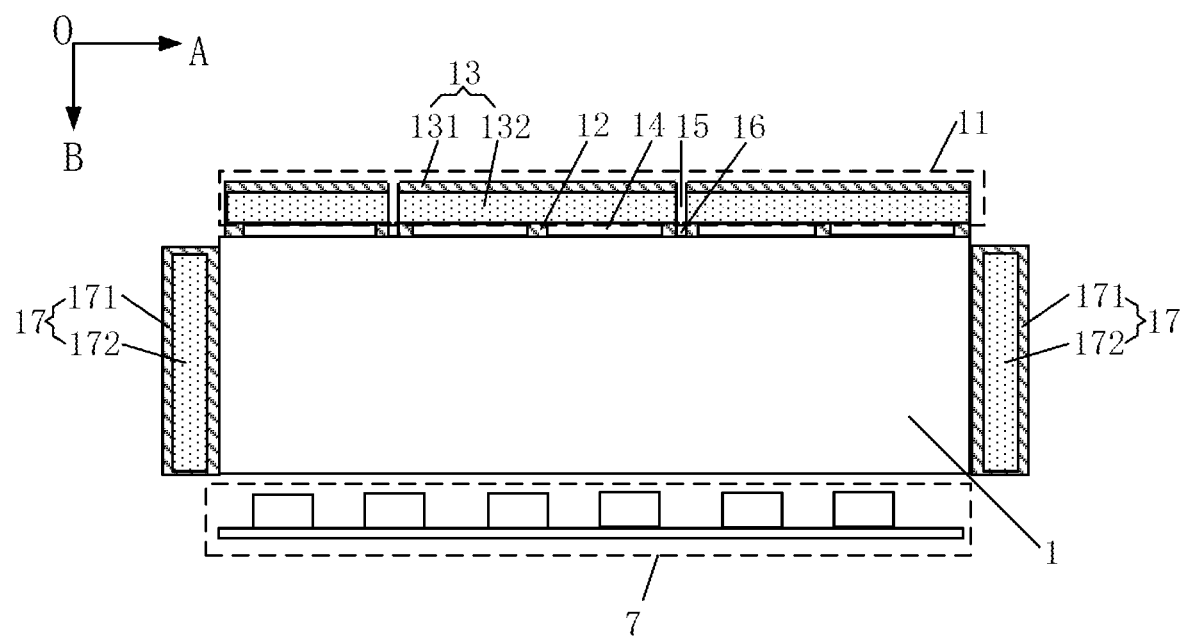

Referring to that shown in FIG. 9, the side-reflection unit further includes the second side-reflection subunits 17, which are not connected with the main reflection unit. The first part (the left side surface shown in FIG. 9) and the second part (the right side surface shown in FIG. 9) are respectively provided with the second side-reflection subunits 17, and the third part (the upper side surface shown in FIG. 9) is provided with the first side-reflection subunit 11.

This structure is mainly used in middle and large size rectangular display screens, with relatively large ratios of length to width. Due to the relatively large ratios of length to width, in order to further improve optical consistency and avoid the problem of degumming and separation of the reflection units caused by high temperature, the second side-reflection subunits are set separately, and the second side-reflection subunits are not connected with the main reflection unit.

Optionally, in order to simplify structure and facilitate production, referring to that shown in FIG. 9, the second side-reflection subunit 17 includes a reflection film 171 and an adhesive film 172, and the reflection film is fixed with the second sub-side surface through the adhesive film. Here, the adhesive film may be a double-sided adhesive tape, and material of the reflection film may be the same as that of the first reflection layer.

In an embodiment of the disclosure, the ratio of the length L2 of the first part (the left side surface shown in FIG. 9) along the first direction (the OB direction shown in FIG. 9) to the length L1 of the third part (the upper side surface shown in FIG. 9) along the second direction (the OA direction shown in FIG. 9) is L, $\frac{1}{5} \leq L \leq \frac{1}{2}$, and the first direction intersects the second direction. Here, the first direction may be the direction of the short-side of the light-guide plate, and the second direction may be the direction of the long-side of the light-guide plate. In this structure, the two short-sides of the light-guide plate are provided with the second side-reflection subunits, one of the two long-sides is provided with the first side-reflection subunit, and the other is provided with the light-emitting unit.

Figure 10:
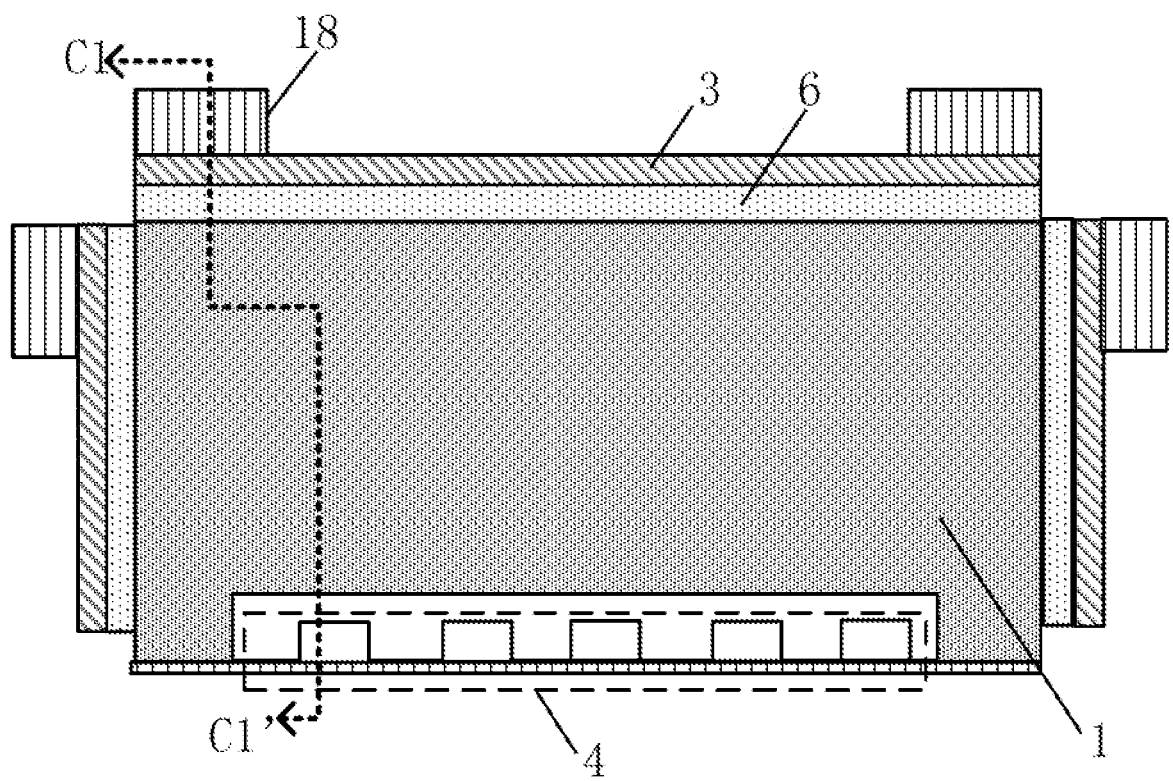
Figure 11:
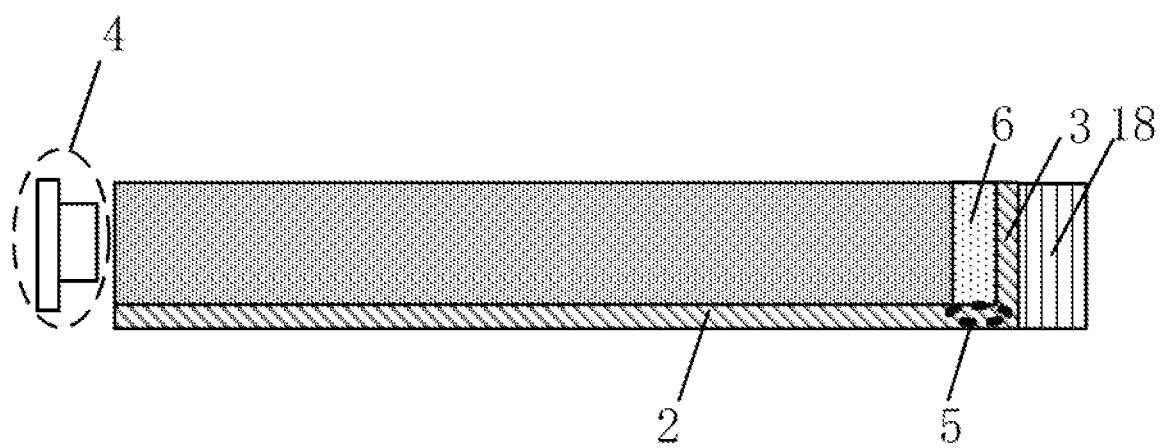
FIG. 11 is a sectional view along a direction of C1C1' in FIG. 10.

In related technologies, in order to better fix the light-guide plate and the side reflect sheet, referring to that shown in FIG. 10 and FIG. 11, the backlight module further includes a silica gel pad 18. Under high temperature, the light-guide plate will expand and drive the side reflect sheet together to squeeze the silica gel pad, such that it is easier to make a shrinkage state of a part of the side reflect sheet corresponding to the silica gel pad, and a shrinkage state of a part of the side reflect sheet not corresponding to the silica gel pad, be inconsistent, thus further aggravating the degumming and separation between the light-guide plate and the part of the side reflect sheet not corresponding to the silica gel pad, and thus resulting in change of backlight brightness.

In order to avoid this problem, the application further provides a specific structure of the light-guide plate and the reflection unit. In one or more embodiments, the second sub-side surface includes the first part (the left side surface shown in FIG. 12) and the second part (the right side surface shown in FIG. 12) set opposite to each other, and the third part (the upper side surface shown in FIG. 12). The third part is respectively connected with the first part and the second part, and the first sub-side surface is respectively connected with the first part and the second part, and is set opposite to the third part.

The third part (the upper side surface shown in FIG. 12) is provided with the first side-reflection subunit 11, and the first part and the second part are provided with either of the first side-reflection subunit and the second side-reflection subunit. The first side-reflection subunit set on the third part is a fixed side-reflection subunit.

Figure 12:
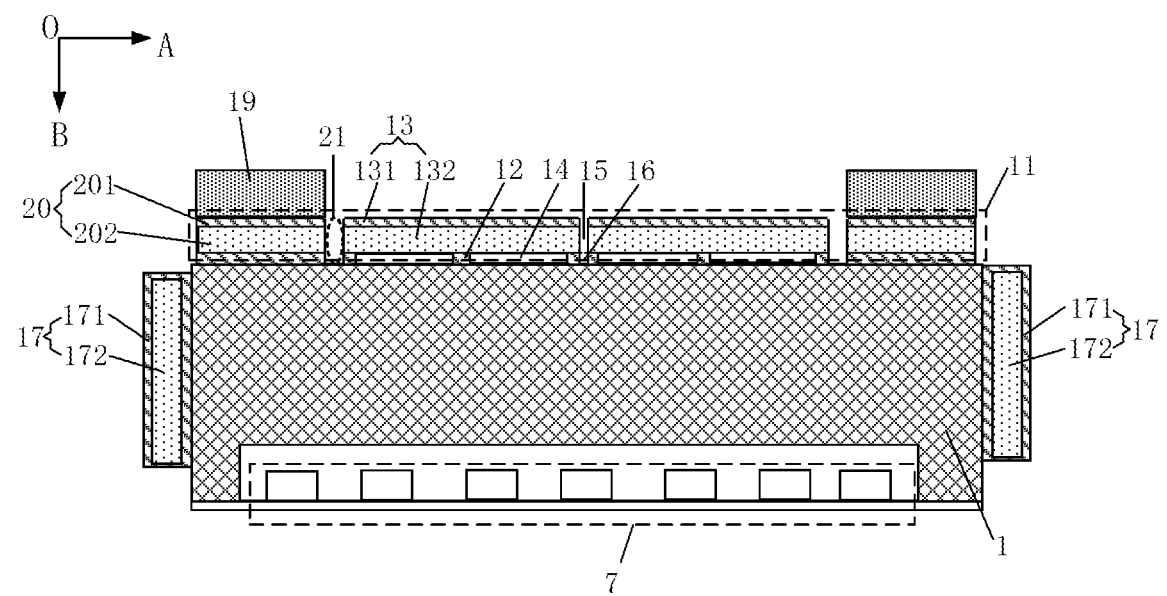
FIG. 12 is a schematic view illustratively showing a structure of another backlight module of the embodiments of the disclosure.

Referring to that shown in FIG. 12, the fixed side-reflection subunit further includes second reflection parts 20. A whole formed by the plurality of first reflection parts in the fixed side-reflection subunit is a fixed side-reflection part. Two ends of the fixed side-reflection part are respectively provided with the second reflection parts 20, and the fixed side-reflection part is not connected with the second reflection parts. The second reflection parts are connected with the main reflection unit.

Referring to that shown in FIG. 12, the backlight module further includes a fixing unit 19, the fixing unit 19 is arranged at a side of the second reflection part 20 away from the third part (the upper side surface shown in FIG. 12), and an orthographic projection of the fixing unit on the third part is within an orthographic projection of the second reflection part on the third part.

The above third part may be a side surface of the long-side of the light-guide plate as shown in FIG. 12, or a side surface of the short-side of the light-guide plate, which is not limited here. In order to provide enough backlight, the light-emitting unit is mostly set at the side surface of the long-side of the light-guide plate. Therefore, the third part is mostly the side surface of the long-side of the light-guide plate.

The above-mentioned setting that the first part and the second part are provided with either of the first side-reflection subunit and the second side-reflection subunit, includes the following cases. In a first case, both the first part and the second part are provided with the first side-reflection subunit. In a second case, referring to that shown in FIG. 12, both the first part (the left side surface shown in FIG. 12) and the second part (the right side surface shown in FIG. 12) are provided with the second side-reflection subunit 17. In a third case, the first part is provided with the first side-reflection subunit, and the second part is provided with the second side-reflection subunit. In a fourth case, the first part is provided with the second side-reflection subunit, and the second part is provided with the first side-reflection subunit.

A structure of the above fixed unit is not limited. For example, the fixing unit may include the silica gel pad. The fixing unit is configured for fixing the light-guide plate and the side-reflection unit.

In the above fixed side-reflection subunit, the second reflection parts are disconnected with the fixed side-reflection part. In this way, under high temperature, when the light-guide plate expands and drives the side-reflection unit together to squeeze the fixed unit, stresses generated by the squeezing of the second reflection part and the fixed unit will not affect the fixed side-reflection part, thus greatly reducing a risk of separation between the fixed side-reflection part and the light-guide plate, and thus ensuring the amount of reflected light in the light-guide plate; such that when the light-guide plate is applied to the display device, it may greatly improve the display quality.

It should be noted that, in order to further fix the light-guide plate and side-reflection unit, the backlight module may further include fixed units arranged at the first part and the second part. Taking the fixed unit set on the first part as an example, if the first side-reflection subunit is set on the first part, the first side-reflection subunit includes a second reflection part and a plurality of first reflection parts. A whole formed by the plurality of first reflection parts is a fixed side-reflection part, and the second reflection part is set at least at an end of the fixed side-reflection part close to the third part, and is not connected with the fixed side-reflection part, and the second reflection parts are connected with the main reflection unit. At this time, a fixing unit is arranged at a side of the second reflection part away from the first part. If the second side-reflection subunit is set on the first part, the fixed unit is set at least at a end of the second side-reflection subunit close to the third part, and on a side of the second side-reflection subunit away from the first part. A structure of the fixed unit on the second part is the same as that of the fixed unit on the first part, which is repeated herein.

In an embodiment of the disclosure, referring to that shown in FIG. 12, in the fixed side-reflection subunit, the two ends and the middle position of the first reflection part 13 are respectively connected with connecting parts 12. A groove 21 is arranged between the fixed side-reflection subunit and the second reflection part 20.

Figure 13:
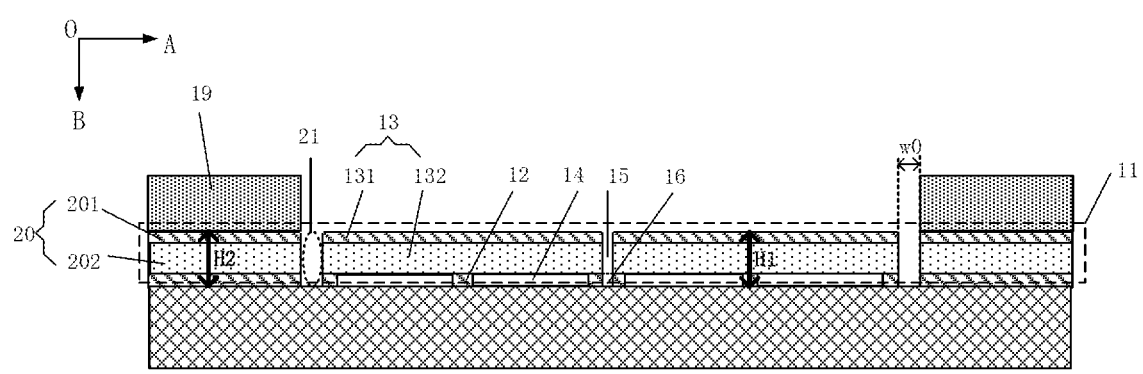
FIG. 13 is a schematic view enlarging a first side-reflection subunit arranged at an upper side of a light-guide plate in FIG. 12.

Because no side-reflection unit is set at a location of the groove, if a width of the groove along the second preset direction is too large, it is easy to produce light leakage, which will increase the light loss for internal reflection of the light-guide plate, thus causing the change of backlight brightness. If the width of the groove along the second preset direction is too small, it is not conducive to separating the fixed side-reflection subunit and the second reflection part, and thus it is not conducive to solving the problem of degumming and separation between the fixed side-reflection subunit and the light-guide plate. In order to give consideration to both, in an embodiment of the disclosure, referring to that shown in FIG. 13, the width w0 of the groove 21 along the second preset direction (the OA direction shown in FIG. 13) ranges from 0.1 mm to 1 mm. For example, the width may be 0.1 mm, 0.3 mm, 0.5 mm, 0.7 mm, 0.9 mm or 1 mm. If the third part is the side surface of the long-side of the light-guide plate, the second preset direction is the direction of the long-side of the light-guide plate as shown in FIG. 13. If the third part is the side surface of the short-side of the light-guide plate, the second preset direction is the direction of the short-side of the light-guide plate. The above groove may be formed by the cutting die process. Due to limitation of the process, the width of the groove along the preset direction ranges from 0.5 mm to 1 mm. Other processes may be used, such as the laser cutting process, as well. At this time, the width of the groove along the preset direction may be less than 0.5 mm, such as 0.2 mm or 0.3 mm.

In an embodiment of the disclosure, in order to facilitate production, and at the same time, increase area of the side-reflection unit as much as possible to increase light amount of internal reflection of the light-guide plate, referring to that shown in FIG. 13, a width H2 of the second reflection part 20 along a direction perpendicular to the second preset direction (an OB direction shown in FIG. 13) is the same as a width H1 of the whole formed by the first reflection part and the connecting parts along the direction perpendicular to the second preset direction (the OB direction shown in FIG. 13).

In an embodiment of the disclosure, referring to that shown in FIG. 12, the second reflection part 20 includes a second reflection layer 201 and a second adhesive layer 202, and the second reflection layer is fixed with the third part through the second adhesive layer. The main reflection unit includes a main reflection layer. The second reflection layer is connected with the main reflection layer. The main reflection layer, the respective second reflection layers, the respective first reflection layers and the respective connecting parts are a whole or integral structure, and such structure may simplify manufacturing process and reduce production cost.

The materials of the above main reflection layer, the respective second reflection layers, the respective first reflection layers and the respective connecting parts are the same. In an actual production process, a reflection sheet including patterns of the main reflection layer, the respective second reflection layers, the respective first reflection layers and the respective connecting parts may be formed first, and then the reflection sheet may be folded along connection positions between the connecting parts and the main reflection layer, as well as the connection positions between the second reflection layers and the main reflection layer, to make the respective second reflection layers, the respective first reflection layers and the respective connecting parts be fixed to the second sub-side surface of the light-guide plate.

Material of the second adhesive layer is not limited. For example, the second adhesive layer may include the double-sided adhesive.

An embodiment of the present application further provides a display screen, including a display panel and the above backlight module, and backlight module is set at a backlight side of the display panel.

The display panel may be a liquid crystal display panel of TIN (Twisted Nematic) type, a VA (Vertical Alignment) type, an IPS (In-Plane Switching) type or an ADS (Advanced Super Dimension Switch) type, and so on. The display screen may be a liquid crystal display screen and any product or component including such display screen, with display function, such as a television set, a digital camera, a mobile phone, a tablet computer, etc.

An embodiment of the application further provides a rearview mirror, including the above display screen. The rearview mirror is applied to a vehicle, a type of the rearview mirror is not limited. For example, the rearview mirror may be a streaming-media rearview mirror. The rearview mirror has good optical consistency, has reliability under high and low temperature, and has low cost.

An embodiment of the application further provides a vehicle, including the above rearview mirror, which is set in an internal space of the vehicle. A type of the vehicle is not limited, which may be a new energy vehicle or a fuel vehicle.

The "one embodiment", "an embodiment" or "one or more embodiments" mentioned in the description here means that specific features, structures or characteristics described in combination with the embodiment are included in at least one embodiment of the present application. In addition, please note that the word "in one embodiment" does not necessarily refer to the same embodiment.

A large number of specific details are described in the specification provided by the disclosure. However, it may be understood that the embodiments of the present application may be practiced without these specific details. In some examples, the well-known methods, structures and techniques are not shown in detail so as not to obscure the understanding of this specification.

Finally, it should be noted that the above embodiments are only used to illustrate the technical solution of the application, not to limit it. Although the present application has been described in detail with reference to the above embodiments, those ordinary skilled in the art should understand that they may still modify the technical solutions recorded in the above embodiments or equally replace some of the technical features. However, these modifications or substitutions do not make the essence of the corresponding technical solutions separate from the spirit and scope of the technical solutions of the embodiments of this application.

The invention claimed is:

1. A backlight module, comprising:
    a light-guide plate, comprising: a light-outlet surface and a backlight surface set opposite to each other, and a side surface, wherein the side surface is respectively connected with the light-outlet surface and the backlight surface, and the side comprises a first sub-side surface and a second sub-side surface connected to each other;
    a light-emitting unit, arranged at the first sub-side surface of the light-guide plate; and
    a reflection unit, comprising: a main reflection unit and a side-reflection unit, wherein the main reflection unit is arranged at the backlight surface of the light-guide plate, the side-reflection unit is arranged at the second sub-side surface of the light-guide plate, the side-reflection unit comprises at least a first side-reflection subunit and a plurality of connecting parts, the plurality of connecting parts are connected with the main reflection unit, the first side-reflection subunit comprises at least a plurality of first reflection parts, each of the first reflection parts is connected with at least one of the connecting parts, a first gap presents between the main reflection unit and a part of the first reflection part where the first reflection part is not connected with the connecting part, and a second gap presents between two adjacent first reflection parts.

2. The backlight module according to claim 1, wherein the first reflection part is connected with the main reflection unit through three connecting parts.

3. The backlight module according to claim 2, wherein two ends and a middle position of the first reflection part are respectively connected with the connecting parts.

4. The backlight module according to claim 3, wherein the two ends of the first reflection part are respectively a first end and a second end, and
    in two adjacent first reflection parts, a third gap is provided, between the connecting part connected with the second end of one of the two first reflection parts and the connecting part connected with the first end of another one of the two first reflection parts, and a position of the third gap corresponds to a position of the second gap.

5. The backlight module according to claim 1, wherein the first reflection part comprises a first reflection layer and a first adhesive layer, the first reflection layer is connected with at least one connecting part and is fixed with the second sub-side surface through the first adhesive layer, and the first reflection layer and the connecting part are an integral structure.

6. The backlight module according to claim 1, wherein sizes of the plurality of connecting parts are the same.

7. The backlight module according to claim 6, wherein a width of the connecting part along a first preset direction ranges from 0.5 mm to 3 mm.

8. The backlight module according to claim 1, wherein a distance between two adjacent first reflection parts along a first preset direction ranges from 0.1 mm to 0.3 mm.

9. The backlight module according to claim 1, wherein the second sub-side surface comprises a first part and a second part set opposite to each other, and a third part, the third part is respectively connected with the first part and the second part, and the first sub-side surface is respectively connected with the first part and the second part and is set opposite to the third part; and
    the side-reflection unit comprises the first side-reflection subunit and the plurality of connecting parts, and the first part, the second part and the third part are respectively provided with the first side-reflection subunit.

10. The backlight module according to claim 9, wherein a ratio of a length of the first part along a first direction to a length of the third part along the second direction is L, $0.8 \leq L \leq 1$, and the first direction intersects the second direction.

11. The backlight module according to claim 1, wherein the second sub-side surface comprises a first part and a second part set opposite to each other, and a third part, the third part is respectively connected with the first part and the second part, and the first sub-side surface is respectively connected with the first part and the second part and is set opposite to the third part; and
    the side-reflection unit further comprises second side-reflection subunits, the second side-reflection subunits are not connected with the main reflection unit, the first part and the second part are respectively provided with the second side-reflection subunits, and the third part is provided with the first side-reflection subunit.

12. The backlight module according to claim 11, wherein the second side-reflection subunit comprises a reflection film and an adhesive film, and the reflection film is fixed with the second sub-side surface through the adhesive film.

13. The backlight module according to claim 11, wherein a ratio of a length of the first part along a first direction to a length of the third part along a second direction is L, $\frac{1}{5} \leq L \leq \frac{1}{2}$, and the first direction intersects the second direction.

14. The backlight module according to claim 1, wherein the second sub-side surface comprises a first part and a second part set opposite to each other, and a third part, the third part is respectively connected with the first part and the second part, and the first sub-side surface is respectively connected with the first part and the second part and is set opposite to the third part;
    the third part is provided with the first side-reflection subunit, the first part and the second part are provided with either of the first side-reflection subunit and the second side-reflection subunit, and the first side-reflection subunit set on the third part is a fixed side-reflection subunit;
    the fixed side-reflection subunit further comprises second reflection parts, a whole formed by the plurality of first reflection parts in the fixed side-reflection subunit is a fixed side-reflection part, two ends of the fixed side-reflection part are respectively provided with the second reflection parts,
    the fixed side-reflection part is not connected with the second reflection parts, and the second reflection parts are connected with the main reflection unit; and
    the backlight module further comprises a fixing unit, the fixing unit is arranged at a side of the second reflection part away from the third par, and an orthographic projection of the fixing unit on the third part is within an orthographic projection of the second reflection part on the third part.

15. The backlight module according to claim 14, wherein, in the fixed side-reflection subunit, two ends and a middle position of the first reflection part are respectively connected with connecting parts; and
    a groove is arranged between the fixed side-reflection subunit and the second reflection part.

16. The backlight module according to claim 14, wherein a width of the second reflection part along a direction perpendicular to a second preset direction is the same as a width of a whole formed by the first reflection part and the connecting parts along the direction perpendicular to the second preset direction.

17. The backlight module according to claim 14, wherein the second reflection part comprises a second reflection layer and a second adhesive layer, and the second reflection layer is fixed with the third part through the second adhesive layer, the main reflection unit comprises a main reflection layer, and the second reflection layer is connected with the main reflection layer; and the main reflection layer, the respective second reflection layers, the respective first reflection layers and the respective connecting parts are an integral structure.

18. A display screen, comprising: a display panel and a backlight module according to claim 1, wherein the backlight module is arranged at a backlight side of the display panel.

19. A rearview mirror, comprising: the display screen according to claim 18.

20. A vehicle, comprising: the rearview mirror according to in claim 19, wherein the rearview mirror is set in an internal space of the vehicle.

\* \* \* \* \*